United States Patent [19]
Tsujikado et al.

[11] Patent Number: 6,091,738
[45] Date of Patent: Jul. 18, 2000

[54] TRANSMISSION-EQUIPMENT AND METHOD FOR ASSIGNING TRANSMISSION-EQUIPMENT IDENTIFICATION NUMBER IN TRANSMISSION SYSTEM

[75] Inventors: Mitsuo Tsujikado; Shuichi Kubota, both of Tokyo, Japan

[73] Assignee: Oki Electric Industry Co., Ltd., Tokyo, Japan

[21] Appl. No.: 08/846,226

[22] Filed: Apr. 28, 1997

[30] Foreign Application Priority Data

Jun. 14, 1996 [JP] Japan ................................. 8-153872

[51] Int. Cl.[7] ................................................ H04L 12/403
[52] U.S. Cl. ........................ 370/453; 370/457; 370/475
[58] Field of Search .................................. 370/475, 457, 370/254, 449, 392, 453, 445; 340/825.07, 825.08, 825.52

[56] References Cited

U.S. PATENT DOCUMENTS

| | | | |
|---|---|---|---|
| 4,689,786 | 8/1987 | Sidhu et al. | 370/225 |
| 4,847,834 | 7/1989 | Bryant | 370/449 |
| 4,849,752 | 7/1989 | Bryant | 340/825.52 |
| 5,148,389 | 9/1992 | Hughes | 395/829 |
| 5,446,897 | 8/1995 | Mathias et al. | 395/200.5 |
| 5,768,277 | 6/1998 | Ohno et al. | 370/457 |

FOREIGN PATENT DOCUMENTS

| | | |
|---|---|---|
| 0 233 735 A1 | 8/1987 | European Pat. Off. . |
| 0 472 874 A1 | 3/1992 | European Pat. Off. . |
| 0 493 905 A1 | 7/1992 | European Pat. Off. . |
| 2 167 274 | 5/1956 | United Kingdom . |
| 2 172 779 | 9/1986 | United Kingdom . |
| 2 216 365 | 10/1989 | United Kingdom . |
| 2 217 561 | 11/1989 | United Kingdom . |
| 2 256 564 | 12/1992 | United Kingdom . |

*Primary Examiner*—Chau Nguyen
*Assistant Examiner*—Soon-Dong Hyun
*Attorney, Agent, or Firm*—Wenderoth, Lind & Ponack, L.L.P.

[57] ABSTRACT

The method for assigning an identification number is constructed in that in a transmission system with transmission system managing equipment being connected to at least one of a plurality of pieces of connected transmission equipment, each of all or some of the transmission equipment acquires information peculiar to adjacent devices connected thereto and holds the information as peripheral connected-state data of each piece of transmission equipment. The transmission system managing equipment collects information from all of the transmission equipment which hold the peripheral connected-state data of each piece of transmission equipment, and on the basis of the information, determines and transmits an identification number for each piece of transmission equipment. Each of the plurality of pieces of transmission equipment carries out internal setting of the identification number thereof transmitted from the transmission system managing equipment. By this duplication of the same identification number among different pieces of transmission equipment, setting error or the like in setting the number can be avoided.

6 Claims, 8 Drawing Sheets

TRANSMISSION-EQUIPMENT AND METHOD FOR ASSIGNING TRANSMISSION-EQUIPMENT IDENTIFICATION NUMBER IN TRANSMISSION SYSTEM

BACKGROUND OF THE INVENTION

1. Field of the Invention

The present invention relates to a method for assigning a transmission-equipment identification number in a transmission system and to transmission equipment that realizes the method.

2. Description of the Related Art

In a transmission system such as one using optical communications, which is used for transmission between remote locations, repeaters are provided on a transmission path in most cases.

FIG. 2 shows an example of such a system having repeaters, wherein a plurality of repeaters 21, 22, 23 (in this drawing, only three) are interposed between terminal equipment 10 and 11 facing each other and transmission system managing equipment 30, 31 are provided in one or both of the pieces of terminal equipment 10, 11 (each component can be referred to as a "device" hereinafter.)

Each piece of transmission system managing equipment 30, 31 is provided to constantly monitor, by using a monitor line, whether there is any failure in the terminal equipment (10 or 11) or in the repeater (21, 22, or 23), so as to maintain a safe operation of the transmission system. This monitoring operation is performed in such a manner that a signal on a system monitor line (which will be hereinafter referred to as a monitor signal) independent of signals on subscribers' lines (each of which will be hereinafter referred to as a main signal) accommodated in the terminal equipment (10 or 11) are transmitted and received between the transmission system managing equipment (30 or 31) and either the terminal equipment (10 or 11) or the repeater (21, 22, or 23) to be monitored.

Here, transmission equipment to be monitored (the terminal equipment 10 or 11, or the repeater 21, 22, or 23) is specified by a device identification number (which will be hereinafter referred to as an ID) assigned to each device to be monitored, which is included in a monitor signal.

Conventionally, the ID is set manually by an operator at the time of installation of each transmission equipment with an ID setting switch such as a DIP switch being provided in the transmission equipment.

However, a conventional method for assigning a transmission-equipment identification number has the following problems:

(1) Prior to installation of a transmission system, it is necessary for an operator to determine IDs without causing any duplication for all the devices in the system. For this reason, when there is a large number of pieces of transmission equipment, there is a possibility that the same ID is mistakenly assigned to different pieces of transmission equipment.

(2) When a setting error or a failure in setting occurs, a supervisory function of the transmission system cannot operate effectively. Therefore, in this case, the operator is forced to go to a position where the transmission equipment is installed and to perform the setting process again.

(3) It is necessary to determine IDs without duplication, whenever a repeater or the like is newly added to or removed from the transmission system. Further, when the ID of transmission equipment other than the transmission equipment newly added or removed is altered, it is also necessary for the operator to perform setting process at a position where the transmission equipment is installed.

In view of the aforementioned, a method for assigning a transmission-equipment identification number and transmission equipment are required, which allow assignment of an ID to each transmission equipment without using an ID setting switch.

SUMMARY OF THE INVENTION

In order to overcome the above problems, it is an object of the present invention to provide a device and a method which can avoid duplication of an identification number among different transmission equipment in a transmission system, avoid an occurrence of a failure in setting of the identification number, and facilitate setting of the identification number even when more transmission equipment is newly installed, and so on.

A first aspect of the present invention is a method for assigning a transmission-equipment identification number in which an identification number is assigned to each of a plurality of pieces of connected transmission equipment in a transmission system in which transmission system managing equipment is connected to at least one of the plurality of pieces of transmission equipment, in which each or some of the plurality of pieces of transmission equipment acquires information peculiar to adjacent devices connected thereto and holds the information as peripheral connected-state data of each transmission equipment. The transmission system managing equipment collects information from all of the transmission equipment which hold the peripheral connected-state data of each transmission equipment, and on the basis of the information, determines and transmits an identification number for each of the pieces of transmission equipment, and each of the plurality of pieces of transmission equipment carries out internal setting of the identification number thereof transmitted from the transmission system managing equipment.

As means for realizing the above method, in a transmission system in which the transmission system managing equipment is connected to at least one of a plurality of pieces of connected transmission equipment, each of the plurality of pieces of transmission equipment comprises: a peripheral connected-state acquiring device which acquires information peculiar to adjacent devices connected to the transmission equipment and holds the information as peripheral connected-state data of the transmission equipment; a peripheral connected-state transmitting device which transmits the peripheral connected-state data to the transmission system managing equipment in accordance with a request for adjacent-station information from the transmission system managing equipment; and an identification number setting device which carries out internal setting of an identification number of the transmission equipment in accordance with a request for setting the identification number including the identification number assigned to the transmission equipment sent from the transmission system managing equipment.

Moreover, in order to realize the above method, transmission system managing equipment which cooperates with the transmission system comprises: a transmitting device which is operable to transmit a request for updating adjacent-station information to each of the pieces of transmission equipment; an adjacent-station information collecting device, which collects, from each of the pieces of transmission equipment holding the peripheral connected-state data of the transmission equipment, the peripheral connected state; a device identification number-determining device which holds a connected state in the entire transmission system from the collected peripheral connected-state data to determine an identification number for each of the pieces of transmission equipment; and an identification number transmitting device which transmits the determined identification number to each of the pieces of transmission equipment.

In accordance with the method for assigning an identification number or the apparatus for realizing the same in the first aspect of the present invention, duplication of the same identification number among different transmission equipment of the transmission system can be prevented, and a setting error of an identification number or a failure in setting the identification number can also be avoided. Further, it is not necessary for an operator to perform any operation for setting the identification number even when more transmission equipment is newly installed and some transmission equipment is removed from the transmission system.

A second aspect of the present invention is a method for assigning a transmission-equipment identification number in which an identification number is assigned for each of a plurality of pieces of transmission equipment connected in a concatenated manner in a transmission system. In this method, after link establishment of the transmission system has been confirmed, transmission equipment disposed at an upstream end position of the plurality of pieces of transmission equipment effects internal setting of an identification number of its own, and subsequently, transmits, to transmission equipment which is adjacently disposed at a downstream side of the upstream transmission equipment, the internally-set identification number or an identification number assigned to the downstream-side transmission equipment. Each of the pieces of transmission equipment disposed at intermediate positions of the plurality of pieces of transmission equipment effects internal setting of an identification number which is generated by itself on the basis of an identification number transmitted from transmission equipment which is disposed adjacently at an upstream side of the intermediate transmission equipment or the transmitted identification number. Each piece of transmission equipment transmits, to transmission equipment which is disposed adjacently at a downstream side of the intermediate transmission equipment, the identification number generated by itself, or the identification number assigned to the downstream transmission equipment. Transmission equipment disposed at a downstream end position of the plurality of pieces of transmission equipment effects internal setting of an identification number which is generated by itself on the basis of an identification number transmitted from transmission equipment which is disposed adjacently at an upstream side of the downstream transmission equipment, or the transmitted identification number.

In order to realize the above method, in a transmission system with a plurality of pieces of transmission equipment connected in a concatenated manner, transmission equipment disposed at an upstream end position of the plurality of pieces of transmission equipment comprises: an identification number setting device which effects internal setting of an identification number previously determined for the transmission equipment at the upstream side; and an identification number transmitting device which transmits, to a transmission equipment which is adjacently disposed at a downstream side of the upstream transmission equipment, the identification number assigned to the transmission equipment at the upstream side or the identification number assigned to the downstream side transmission equipment on the basis of the former identification number.

Further, transmission equipment disposed at an intermediate position of the plurality of pieces of transmission equipment comprises: an identification number setting device which effects internal setting of an identification number which is generated by itself on the basis of an identification number transmitted from transmission equipment which is adjacently disposed at an upstream side of the intermediate transmission equipment, or the transmitted identification number; and an identification number transmitting device which transmits, to transmission equipment which is adjacently disposed at an upstream side of the intermediate transmission equipment, the identification number assigned to the intermediate transmission equipment or the identification number assigned to the transmission equipment disposed at the downstream side.

Moreover, transmission equipment disposed at a downstream end position of the plurality of pieces of transmission equipment comprises an identification number setting device which effects internal setting of an identification number which is generated by the downstream side transmission equipment on the basis of an identification number transmitted from transmission equipment which is adjacently disposed at an upstream side of the downstream transmission equipment or the transmitted identification number.

In accordance with the method for assigning an identification number or the apparatus for realizing the same in the second aspect of the present invention, in the same manner as in the first aspect, duplication of the same identification number among different pieces of transmission equipment of the transmission system can also be avoided, and a setting error of the identification number or a failure in setting the same can also be avoided. Further, it is not necessary for the operator to perform any operation for setting the identification number even when more transmission equipment is newly installed and some transmission equipment is removed from the transmission system.

DESCRIPTION OF THE PREFERRED EMBODIMENTS

FIRST EMBODIMENT

Figure 2:
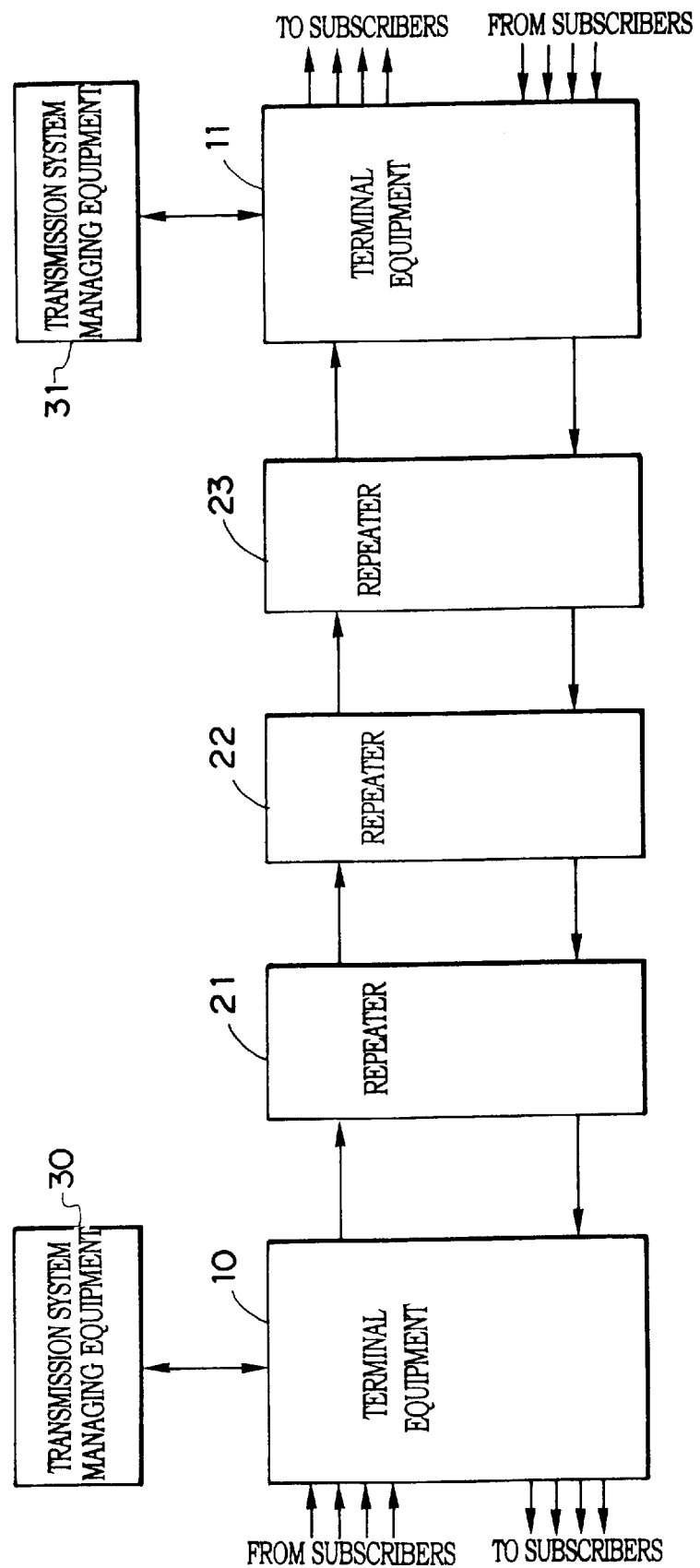
FIG. 2 is a block diagram which shows an example of the structure of a transmission system.

Referring now to the attached drawings, a method for assigning a transmission-equipment identification number, transmission equipment, as well as transmission system managing equipment, according to a first embodiment of the present invention will be hereinafter described in detail. Note that a transmission system according to the first embodiment has the same structure as that shown in FIG. 2.

Structure of the First Embodiment

Figure 3:
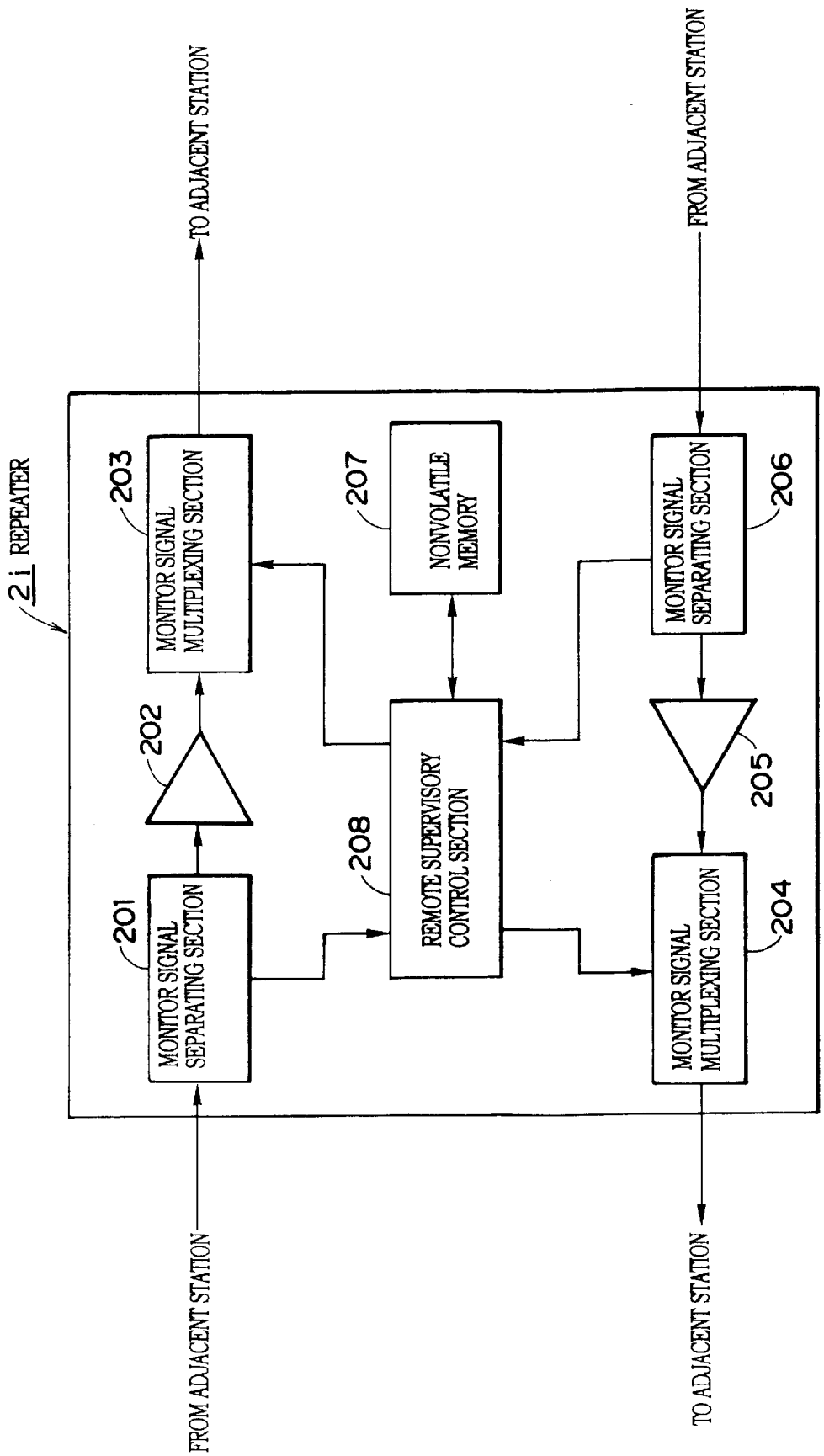
FIG. 3 is a block diagram which shows the structure of internal principal portions of a repeater in the first embodiment.

FIG. 3 shows the structure of internal principal portions of a repeater 2i (i designates 1, 2, or 3). In FIG. 3, the repeater 2i includes monitor signal separating sections 201, 206 respectively for each of the transmitting directions, main signal repeating sections 202, 205 respectively for each of the transmitting directions, monitor signal multiplexing sections 203, 204 respectively for each of the transmitting directions, a remote supervisory control section 208 and a nonvolatile memory (for example, a magnetic disk, or EEPROM) 207.

Meanwhile, in a repeater in a conventional method for assigning a transmission-equipment identification number, an ID setting switch associated with the remote supervisory control section is provided in addition to the above-described components. However, in the repeater according to the present embodiment, the ID setting switch is not provided.

The monitor signal separating sections 201, 206 are each provided to separate a monitor signal multiplexed with a transmission signal received from an adjacent station and output to the remote supervisory control section 208, and at the same time, send a main signal to the main signal repeating sections 202, 205, respectively. The main signal repeating sections 202, 205 are each provided to amplify the main signal and send the same to the monitor-signal multiplexing sections 203, 204, respectively. The monitor signal multiplexing sections 203, 204 are each provided to multiplex the monitor signal from the remote supervisory control section 208 with the main signal received from the main signal repeating sections 202, 205, respectively, and transmit the thus multiplexed signals to their respective adjacent stations.

The remote supervisory control section 208 decodes the messages contained in the monitor signals separated at the monitor signal separating sections 201, 206, respectively, for controlling the local station itself, and sending monitor signals including fault information of itself, and so on, to the monitor signal multiplexing sections 203, 204, respectively. In this embodiment, the remote supervisory control section 208 performs an ID assignment controlling operation in the repeater 2i, which will be described below.

The nonvolatile memory 207 of this embodiment is accessed via the remote supervisory control section 208. Stored in the nonvolatile memory 207 are a fault history, a device ID, a device name, a device manufacturer's name and a device serial number of the local station itself, and further information in connection with an adjacent station (a repeater or a terminal equipment) such as a device name, a device manufacturer's name, and a device serial number of the adjacent station.

Figure 4:
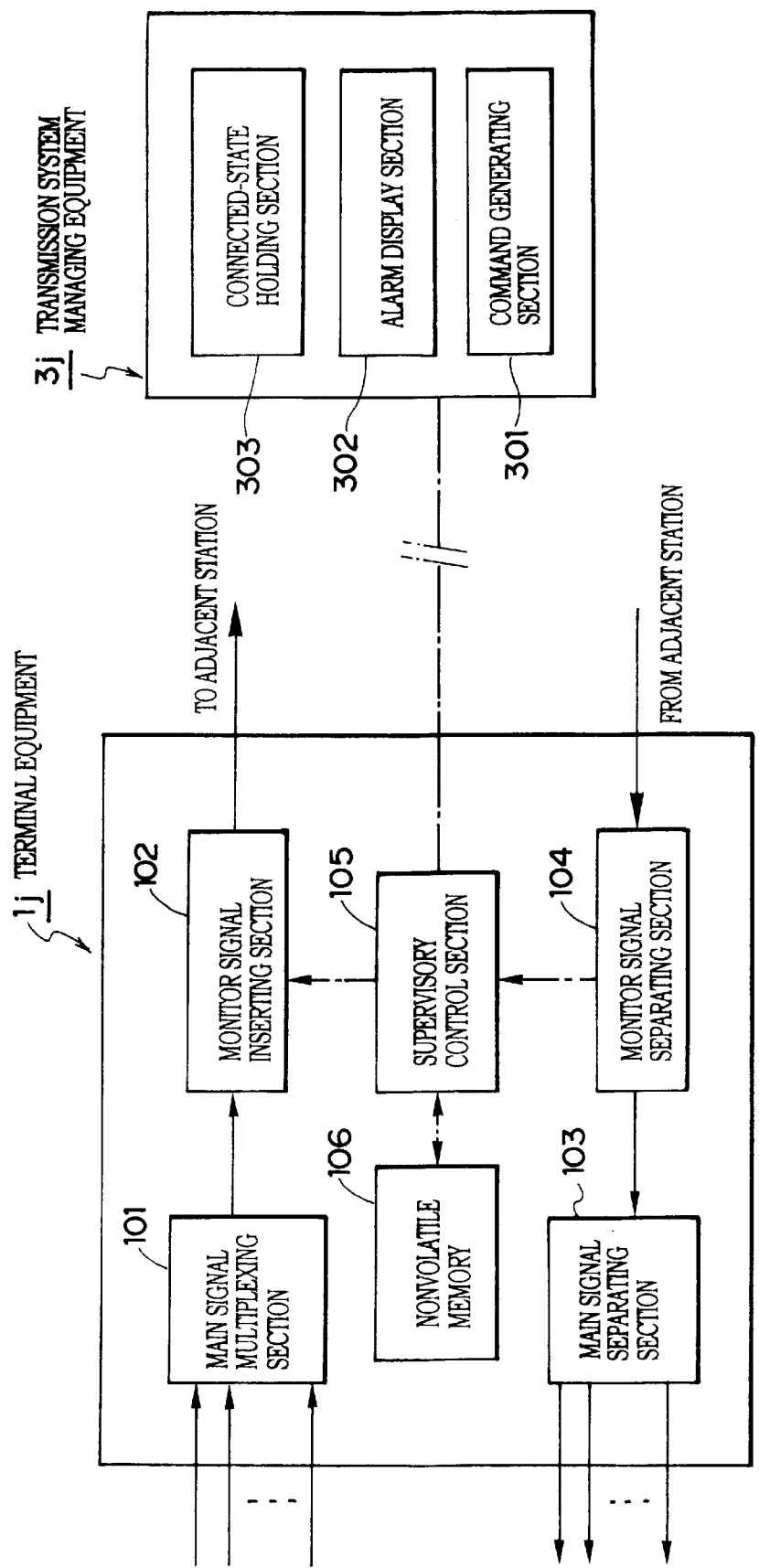
FIG. 4 is a block diagram which shows each structure of respective internal principal portions of a terminal equipment and transmission system managing equipment in the first embodiment.

FIG. 4 shows each structure of respective internal principal portions of the terminal equipment 1j (j designates 1 or 2) and the transmission system managing equipment 3j. In FIG. 4, the terminal equipment 1j shown in a block diagram illustrates the structure of internal principal portions of the terminal equipment according to the first embodiment.

The terminal equipment 1j includes a main signal multiplexing section 101, a monitor signal inserting section 102, a main signal separating section 103, a monitor signal separating section 104, a supervisory control section 105, and a nonvolatile memory 106.

The main signal multiplexing section 101 multiplexes main signals from a plurality of subscribers' loops and outputs the multiplexed main signals to the monitor signal inserting section 102. The monitor signal inserting section 102 is provided to multiplex a monitor signal from the supervisory control section 105 with the main signal from the main signal multiplexing section 101 and output the thus multiplexed signals to the adjacent station. The main signal separating section 103 separates the multiplexed main signals from the monitor signal separating section 104 and outputs to each of the subscribers' loops. The monitor signal separating section 104 separates the monitor signal from the transmission signal and sends the monitor signal to the supervisory control section 105 and sends the main signal, which is left after the separation of the transmission signal, to the main signal separating section 103.

The supervisory control section 105 decodes a message of the monitor signal addressed to the terminal equipment thereof, which is separated at the monitor signal separating section 104, so as to control the local station, control the same in accordance with monitor information from the transmission system managing equipment 3j which is addressed to the terminal equipment, and also to output the monitor signal to the monitor signal inserting section 102 in accordance with monitor information from the transmission system managing equipment 3j, which is addressed to another transmission equipment. In this embodiment, the supervisory control section 105 is provided to perform an ID assignment controlling operation in the terminal equipment 1j, which will be described below.

The nonvolatile memory 106 of this embodiment is accessed via the supervisory control section 105. Stored in the nonvolatile memory 106 are a fault history, a device ID, a device name, a device manufacturer's name, and a device serial number of the terminal equipment, and further information in connection with an adjacent station (a repeater) such as a device name, a device manufacturer's name, and a device serial number of the adjacent station.

The transmission system managing equipment 3j is formed by a data processing apparatus such as a workstation connected to the supervisory control section 105 of the terminal equipment 1j, whereby an operator can suitably perform a maintenance management operation, and particularly the software portion thereof achieves a management function of the transmission system.

The function of the transmission system managing equipment 3j is divided into three large portions: a command generating section 301 which generates a command for collecting information or the like from the terminal equipment 1j or the repeater 2i; an alarm display section 302 which displays the collected information in an unaltered state or with an alarm; and a connected-state holding section 303 which holds a connecting relationship in the transmission system on the basis of the adjacent-station information from each transmission equipment and determines an ID for each transmission equipment.

Operation of the First Embodiment

Next, various operations associated with ID assignment in the first embodiment will be described with reference to the attached drawings. Meanwhile, in the description given below, the side of the terminal equipment 10 is referred to as an upstream side in the transmission path and the side of the terminal equipment 11 is referred to as a downstream side in the transmission path. Further, it should be noted that one transmission system managing equipment (in this case, 30) is a controller which principally effects an operation associated with ID assignment.

First, referring now to the sequence diagram shown in FIG. 5, an operation, in which information of the adjacent stations (for example, the repeater or the terminal equipment in both directions) is taken by each piece of transmission equipment, will be described in the case of the repeater 22.

The take-in operation of the adjacent-station information is performed by additionally-installed transmission equipment when it is built up (i.e., when a power source is inputted) (1); or is performed by each piece of transmission equipment when the system managing equipment 30 transmits a "request for updating the adjacent-station information" by broadcast communication at a predetermined period (for example, once an hour) (2).

Procedure T1: When the take-in operation of the adjacent-station information starts in accordance with the above-described operation, the repeater 22 (its remote supervisory control section 208) adds "device manufacturer's name, device name, and device serial number" which is information peculiar to the local device 22, stored in the nonvolatile memory 207, to "request for alteration of the adjacent-station information", and transmits, as a message to the adjacent station (which is specified by information other than the ID, or which is specified by a link being established between the adjacent stations), to the repeaters 21, 23, which are upstream and downstream adjacent stations, respectively.

Procedure T2: The remote supervisory control section 208 of the repeater 21 in which the above message has been received updates the adjacent-station information about the downstream side transmission equipment in the nonvolatile memory 207 to the "device manufacturer's name, device name, and device serial number" contained in the received message, in other words, to the peculiar information of the repeater 22. Similarly, the remote supervisory control section 208 of the repeater 23 in which the message has been received updates the adjacent-station information about the upstream side transmission equipment in the nonvolatile memory 207 to the "device manufacturer's name, device name, and device serial number" contained in the received message, in other words, to the peculiar information of the repeater 22.

Procedure T3: The remote supervisory control section 208 of the repeater 21, in which alteration of the adjacent-station information as described above has been completed, returns to the adjacent station (i.e., the repeater 22) from which the message has been transmitted the "confirmation of a request for alteration of the adjacent-station information being received" together with the information such as "device manufacturer's name, device name, and device serial number" which is peculiar to the local device 21 stored in its nonvolatile memory 207. Similarly, the remote supervisory control section 208 of the repeater 23 returns to the adjacent station (i.e., the repeater 22) from which the message has been transmitted the "confirmation of a request for alteration of the adjacent-station information being received" together with the information such as "device manufacturer's name, device name, and device serial number" which is peculiar to the local device 23 stored in its nonvolatile memory 207.

Procedure T4: The remote supervisory control section 208 of the repeater 22, which has received the returned message from the repeater 21 sets the "device manufacturer's name, device name, and device serial number" included in the message (i.e., the information peculiar to the repeater 21) in the nonvolatile memory 207 as the adjacent-station information about the upstream side transmission equipment thereof. At the same time, the remote supervisory control section 208 sets the "device manufacturer's name, device name, and device serial number" included in the message returned from the repeater 23 (i.e., the information peculiar to the repeater 23) in the nonvolatile memory 207, as the adjacent-station information about the downstream side transmission equipment thereof.

Through the above-described processing, each transmission equipment is capable of obtaining and holding the information peculiar to an adjacent station.

A description will be hereinafter given of an operation for determining an ID of each piece of transmission equipment and setting the ID for each piece of transmission equipment with reference to the sequence diagram shown in FIG. 1.

Procedure T11: The transmission system managing equipment 30 broadcasts "request for adjacent-station information" to all of the transmission equipment at a predetermined period (for example, once an hour).

Procedure T12: Each piece of transmission equipment (i.e., the repeaters 21, 22, and 23 and the terminal equipments 10 and 11) having received the broadcast communication of "request for adjacent-station information" responds to the transmission system managing equipment 30 with the "device manufacturer's name, device name, and device serial number" which is the information peculiar to a local device and the "adjacent-station information" about a station adjacent to the local device, which are added to the "reception confirmation of a request for adjacent-station information". For example, when the repeater 22 receives broadcast communication of the "request for adjacent-station information", it responds to the transmission system managing equipment 30 with the "device manufacturer's name, device name, and device serial number" which is the information peculiar to the local device 22 and "device manufacturer's name, device name, and device serial number" for the repeaters 21 and 23 adjacent thereto, which have been added to the "reception confirmation of a request for adjacent-station information".

Procedure T13: When the adjacent-station information of all the transmission equipment in the transmission system is collected in the above-described manner, the transmission system managing equipment 30 prepares and updates the connected state in the transmission system on the basis of the adjacent-station information, and determines an ID for each piece of transmission equipment in accordance with the obtained connected state. Meanwhile, in this stage, the determined ID is stored in a buffer memory and is not stored in a storage region of IDs.

Procedure T14: Thereafter, the transmission system managing equipment 30 transmits, to each piece of transmission equipment in the transmission system, a message including "ID" assigned to the transmission equipment and the "device manufacturer's name, device name, and device serial number" peculiar to the transmission equipment, which is added to the "ID setting request".

Procedure T15: When a message including the "device manufacture's name, device name, and device serial number" which is the information peculiar to a local device is received, each piece of transmission equipment takes in the message as a message addressed to itself and writes the ID included in the message into the nonvolatile memory (106, 207) as the ID assigned to a local device thereof.

Procedure T16: Each piece of transmission equipment returns, to the transmission system managing equipment 30, a response with the "ID" assigned to a local device thereof and the "device manufacturer's name, device name, and device serial number" peculiar to the local device, which is added to the "reception confirmation of an ID setting request".

Procedure T17: After the transmission system managing equipment 30 having received the response from each of the pieces of transmission equipment confirms, on the basis of the responded contents, and having checked whether the ID assigned to each piece of transmission equipment has been correctly set in each piece of transmission equipment, the device 30 updates all the IDs primarily assigned to the transmission equipment and stored in the storage region of IDs to newly-determined IDs (including the IDs assigned for the first time). As a result, the transmission system managing equipment 30 performs a subsequent system managing operation by using the newly-determined IDs.

In such a manner as described above, the transmission system managing equipment 30 can determine an ID for each piece of transmission equipment to set the same.

Meanwhile, as a method which allows another transmission system managing equipment 31 to be brought into an ID managing state similar to that of the transmission system managing equipment 30, there can be provided a method in which the transmission system managing equipment 31 performs an ID setting operation independently. In this case, by setting in advance a value of an ID for the utmost downstream or upstream transmission equipment and executing the same ID setting algorithm, the transmission system managing equipment 30 and 31 can be brought into the same ID managing state.

Figure 1:
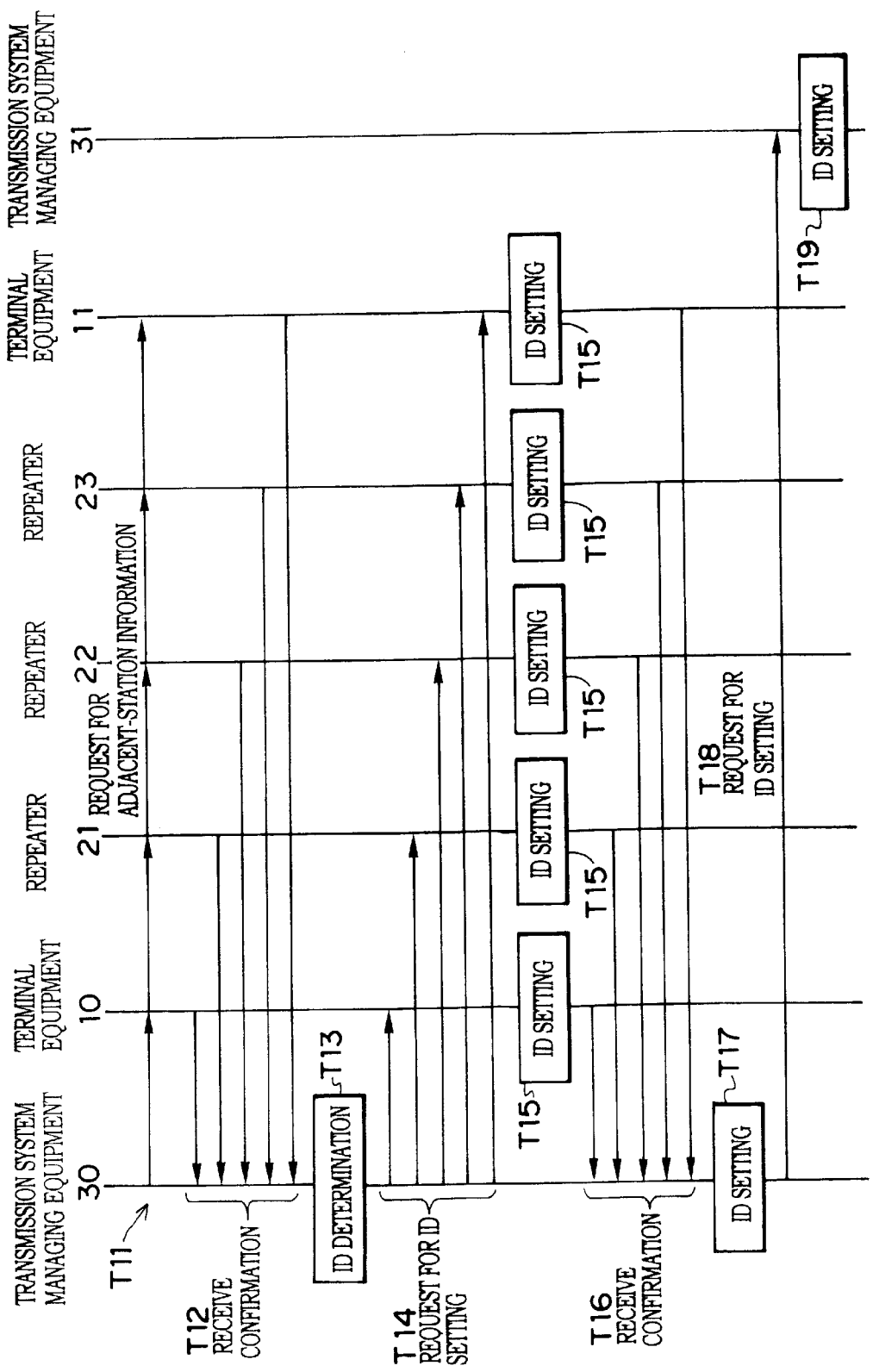
FIG. 1 is a sequence diagram which shows an identification number setting operation according to a first embodiment of the present invention.

Further, as the method which allows another transmission system managing equipment 31 to be brought into an ID managing state similar to that of the transmission system managing equipment 30, there can be provided, as shown in FIG. 1, a method in which a message with "ID" of each transmission equipment and the "device peculiar information" being added to the "ID setting request" is transmitted from one transmission system managing equipment 30 to another transmission system managing equipment 31 (procedure T17), and by receiving the message, another transmission system managing equipment 31 sets an "ID" for each transmission equipment (procedure T19).

Figure 5:
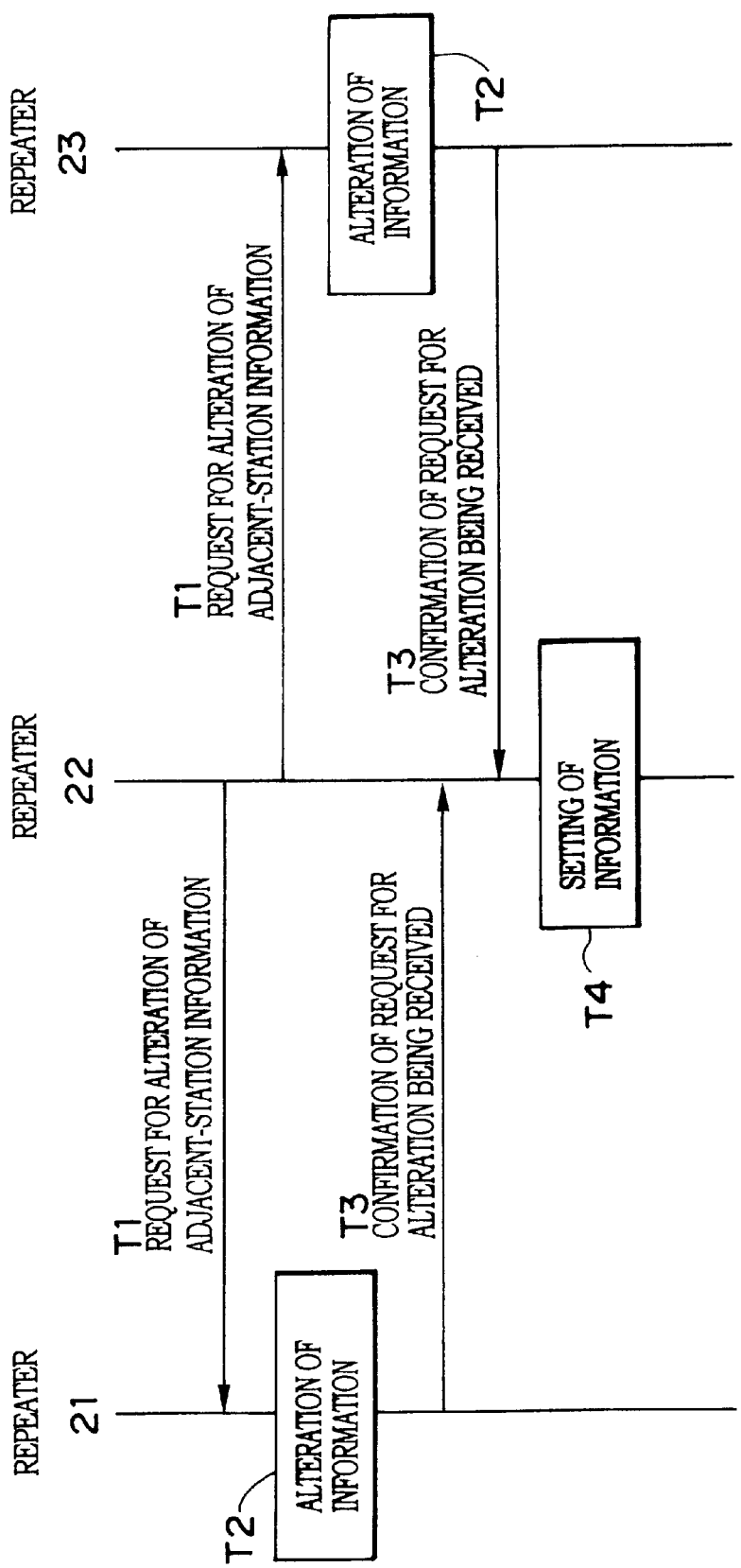
FIG. 5 is a sequence diagram which shows an operation for collecting adjacent-station information in the first embodiment.

In the first embodiment, when the transmission system is started up, the transmission system managing equipment 30 sends a "request for updating adjacent-station information" by broadcast communication (omitted in the sequence diagram) to cause each piece of transmission equipment to obtain information of the adjacent station by the sequence shown in FIG. 5. Subsequently, the transmission system managing equipment 30 executes the sequence shown in FIG. 1 which starts from transmission of the "request for adjacent-station information" by broadcast communication to all the transmission equipment and assigns IDs to the respective transmission equipment accordingly.

Further, when more transmission equipment is newly installed in the transmission system, at the time of a power source being input, the newly-installed transmission equipment executes the sequence shown in FIG. 5 and obtains information of the adjacent stations. Subsequently, the transmission system managing equipment 30 executes, for all of the transmission equipments, the sequence shown in FIG. 1 which starts from transmission of the "request for adjacent-station information" by broadcast communication, so that re-assignment of IDs for the transmission equipment including the newly-installed transmission equipment can be made.

Figure 6:
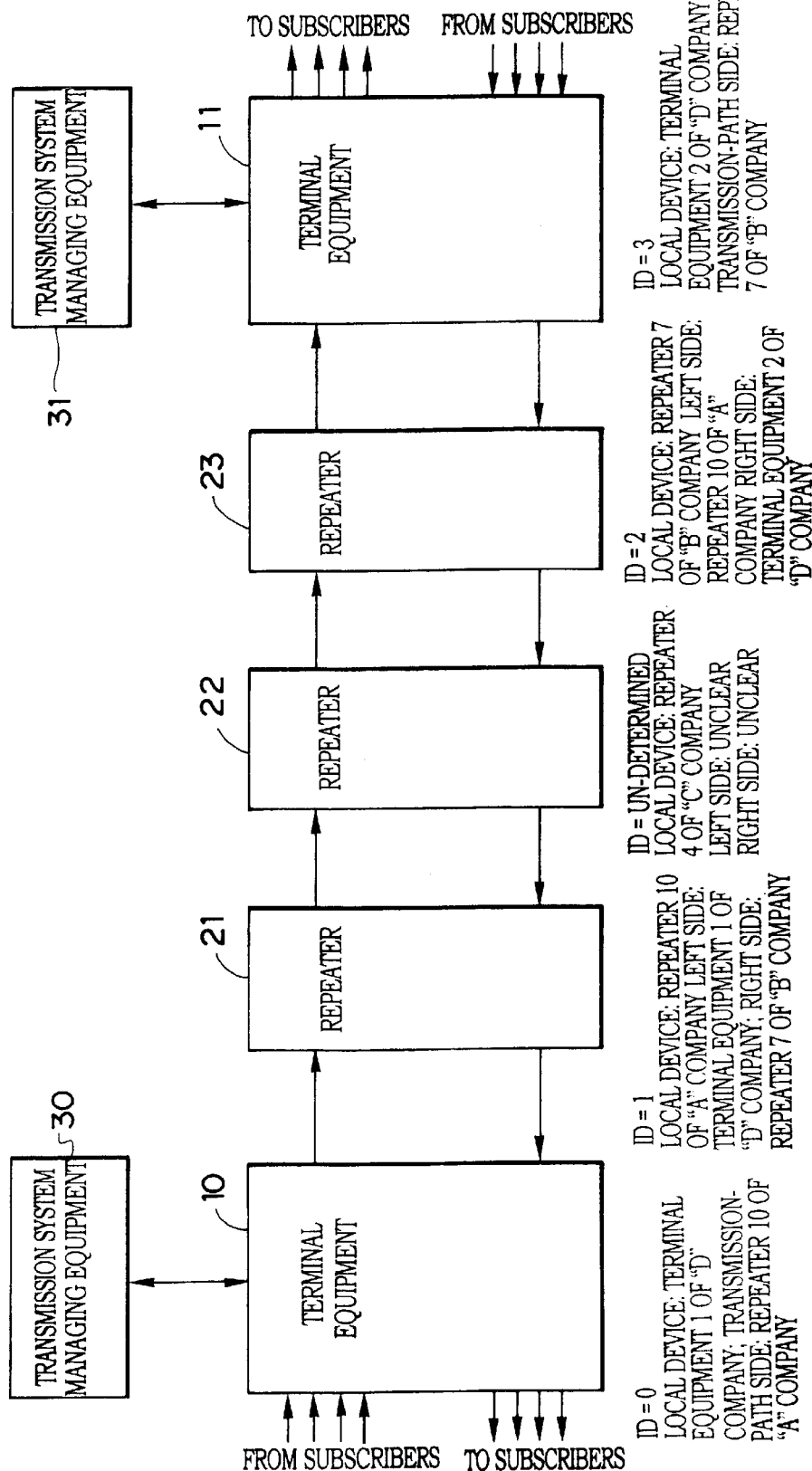
FIG. 6 is a block diagram which shows an example of information held by each piece of transmission equipment, before ID alteration is executed when more transmission equipment is newly installed in the first embodiment.
Figure 7:
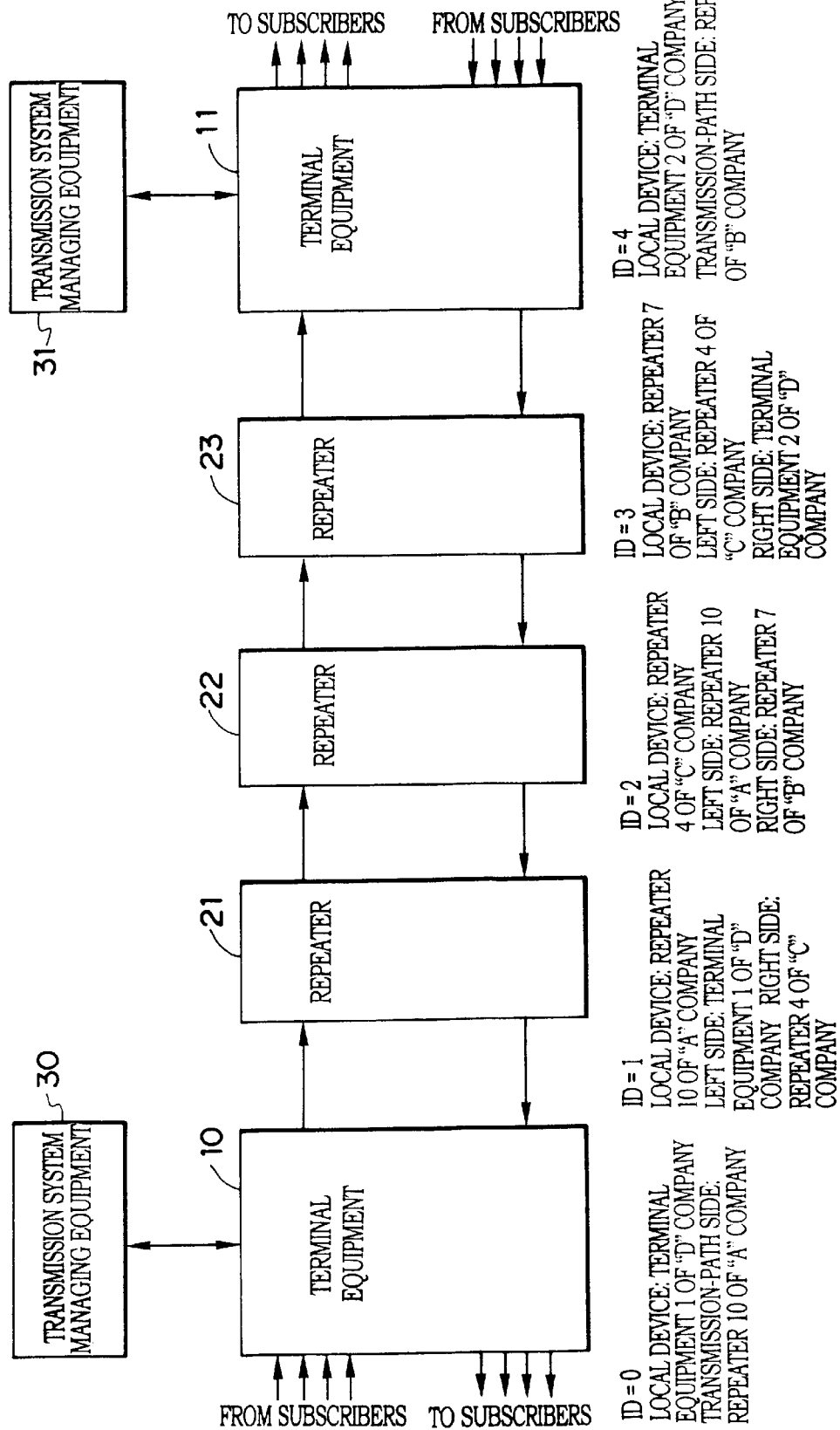
FIG. 7 is a block diagram which shows an example of information held by each piece of transmission equipment, after ID alteration has been executed when more transmission equipment is newly installed in the first embodiment.

Meanwhile, FIG. 6 shows an example wherein information stored in each piece of transmission equipment is in such a state that the adjacent-station information has not been fetched immediately after the repeater 22 was installed. FIG. 7 shows an example wherein information stored in each piece of transmission equipment is in such a state that re-assignment of IDs is made by a series of processes when more devices are newly installed as described above.

Further, when some transmission equipment is removed from the transmission system, the transmission system managing equipment 30 sends a "request for updating adjacent-station information" (omitted in the sequence diagram) by broadcast communication to cause each transmission equipment to obtain information of the adjacent stations by the sequence shown in FIG. 5. Subsequently, the transmission system managing equipment 30 executes the sequence shown in FIG. 1 which starts from transmission of the "request for adjacent-station information" by broadcast communication to all the transmission equipment and newly assigns IDs to the respective transmission equipment accordingly.

Effects of the First Embodiment

As described above, the first embodiment is constructed in that, only after the transmission system managing equipment causes each piece of transmission equipment to obtain adjacent-station information which is peculiar thereto and collects the adjacent-station information from each transmission equipment to hold the connected state among the transmission equipments, assignment of an ID for each transmission equipment and setting of the ID therein are made. For this reason, the following effects can be achieved:

(1) Since ID is assigned to each piece of transmission equipment by obtaining "device manufacturer's name, device name, and device serial number" which is the information peculiar to each transmission equipment to hold the connected-state of the transmission equipment, it is possible to avoid duplication of an identical ID in the different pieces of transmission equipment in the transmission system.

(2) Since the ID determination is automatically made by the transmission system managing equipment and ID setting is automatically made by each piece of transmission equipment, there is no possibility that a setting error or a failure in setting can occur, and it is not necessary for an operator to effect any ID setting operation.

(3) Even when more transmission equipment is newly installed in the transmission system or some transmission equipment is removed from the system, ID determination is automatically made by the transmission system managing equipment and ID setting is automatically made by each piece of transmission equipment. For this reason, there is no possibility that a setting error or a failure in setting can occur, and it is not necessary for an operator to effect an operation for alteration of ID setting. Moreover, even in this case, duplication of an ID does not occur in the different pieces of transmission equipment.

SECOND EMBODIMENT

Referring now to the attached drawings, a method for assigning a transmission-equipment identification number and transmission equipment according to a second embodiment of the present invention will be hereinafter described in detail. Note that the transmission system according to the second embodiment has the same structure as that shown in FIG. 2.

Meanwhile, the second embodiment is constructed such that the transmission system managing equipment does not have a function of ID assignment and terminal equipment and repeaters cooperate with one another to perform an ID assigning/setting operation.

Structure of the Second Embodiment

Respective internal structures of the terminal equipment 1j, repeater 2j and transmission system managing equipment 3j are the same as those shown in FIGS. 3 and 4 according to the first embodiment.

However, neither device-peculiar information of the local device nor device-peculiar information of the adjacent stations is stored in each of the nonvolatile memories 106, 207 of the terminal equipment 1j and the repeater 2i. Namely, in this embodiment, the device peculiar information is not used for assignment of IDs. Further, respective processing contents of the supervisory control section 105 of the terminal equipment 1j and the remote supervisory control section 208 of the repeater 2i are different from those in the first embodiment. Moreover, since this embodiment is constructed such that the transmission system managing equipment 3j is not concerned with ID assignment, the connected-state holding section 303 is not provided in the transmission system managing equipment 3j.

Operation of the Second Embodiment

Next, an ID setting operation in the second embodiment will be described with reference to the sequence diagram shown in FIG. 8.

Procedure T21: When a transmission system is constructed and the terminal equipment 10 starts an initial operation, the terminal equipment 10 transmits a "confirmation of link establishment" command to the repeater 21. When receiving the "confirmation of link establishment" command, the repeater 21 confirms link establishment with the adjacent station 22, and thereafter, transmits the "confirmation of link establishment" command to the repeater 22. When receiving the "confirmation of link establishment" command, the repeater 22 confirms link establishment with the adjacent station 23, and thereafter, transmits the "confirmation of link establishment" command to the repeater 23. When receiving the "confirmation of link establishment" command, the repeater 23 confirms link establishment with the adjacent station 11, and thereafter, transmits the "confirmation of link establishment" command to the terminal equipment 11.

Procedure T22: When the terminal equipment 11 receives the "confirmation of link establishment" command, the terminal equipment 11 transmits the "link establishment" command to the terminal equipment 10 opposite thereto.

Procedure T23: After the terminal equipment 10 transmits the "link establishment" command to the repeater 21, the device 10 waits for transmission of the "link establishment" command from the terminal equipment 11 opposite thereto. When the "link establishment" command is not returned even when a predetermined time has lapsed, or when a command which indicates an abnormal condition of link establishment was transmitted from any one of the transmission equipments, the terminal equipment 10 transmits, to the transmission system managing equipment 30, a notice of an abnormal link establishment.

On the other hand, when the "link establishment" command is returned from the terminal equipment 11 to the terminal equipment 10 and it is confirmed that the link establishment in the entire transmission system has been properly executed, the terminal equipment 10 sets an ID of the local device at an initial value "n" (which is stored in the nonvolatile memory 106). Subsequently, the terminal equipment 10 transmits, to the adjacent repeater 21, an "ID setting request" command having an ID value "n+1" which is one larger than the ID value of the device 10.

Procedure T24: When receiving the "ID setting request" command, the repeater 21 sets, as the ID value thereof, the ID value "n+1" included in the command (which is stored in the nonvolatile memory 207). Subsequently, the repeater 21 transmits, to the adjacent repeater 22, an "ID setting request" command having an ID value "n+2" which is one larger than the ID value of the device 21.

Procedure T25: When receiving the "ID setting request" command, the repeater 22 sets, as the ID value thereof, the ID value "n+2" included in the command (which is stored in the nonvolatile memory 207). Subsequently, the repeater 22 transmits, to the adjacent repeater 23, an "ID setting request" command having an ID value "n+3" which is one larger than the ID value of the device 22.

Procedure T26: When receiving the "ID setting request" command, the repeater 23 sets, as the ID value thereof, the ID value "n+3" included in the command (which is stored in the nonvolatile memory 207). Subsequently, the repeater 23 transmits, to the adjacent terminal equipment 11, an "ID setting request" command having an ID value "n+4" which is one larger than the ID value of the device 23.

Procedure T27: When the terminal equipment 11 receives the "ID setting request" command, the device 11 sets, as the ID value thereof, the ID value "n+4" included in the command (which is stored in the nonvolatile memory 106). Subsequently, the terminal equipment 11 transmits an "ID setting ends" command to the terminal equipment 10 opposite thereto.

When the terminal equipment 10 receives the "ID setting ends" command, the ID setting processing ends. Meanwhile, when an abnormal condition occurs, for example, when the terminal equipment 10 could not receive the "ID setting ends" command within a predetermined time after the "ID setting request" command was first transmitted to the adjacent repeater 21, the processing in the above procedure T23 is performed again. When an abnormal condition such as a case that the "ID setting ends" command cannot be received, occurs a plurality of times, the terminal equipment 10 sends a notice to the transmission system managing equipment 30.

In the second embodiment, a description of the transmission system was given in which it is not necessary for the transmission system managing equipment 30, 31 to store and manage an ID assigned to each piece of transmission equipment. Even in the case of this transmission system, an initial value set by the terminal equipment 10 and the number of pieces of transmission equipment are recognized by an operator, and therefore, it is possible for the operator to input the ID by an input operation to fetch the monitor signal from the device at every time. Further, when the monitor signal such as fault information, to which the ID is assigned, is sent from a transmission equipment, it is sufficient that a counting operation is effected for each ID and that some command with the received ID is transmitted to the transmission equipment.

Meanwhile, in the second embodiment, in order that the transmission system managing equipment 30, 31 store and manage IDs of the transmission equipment, for example, it can be arranged such that a notice in which ID setting ends is transmitted from the terminal equipment 10 to the transmission system managing equipments 30, 31, the "ID setting request" command is transmitted by broadcast communication from the transmission system managing equipment 30 to each transmission equipment, and the ID or the ID having device peculiar information is returned from each transmission equipment to the device 30.

Figure 8:
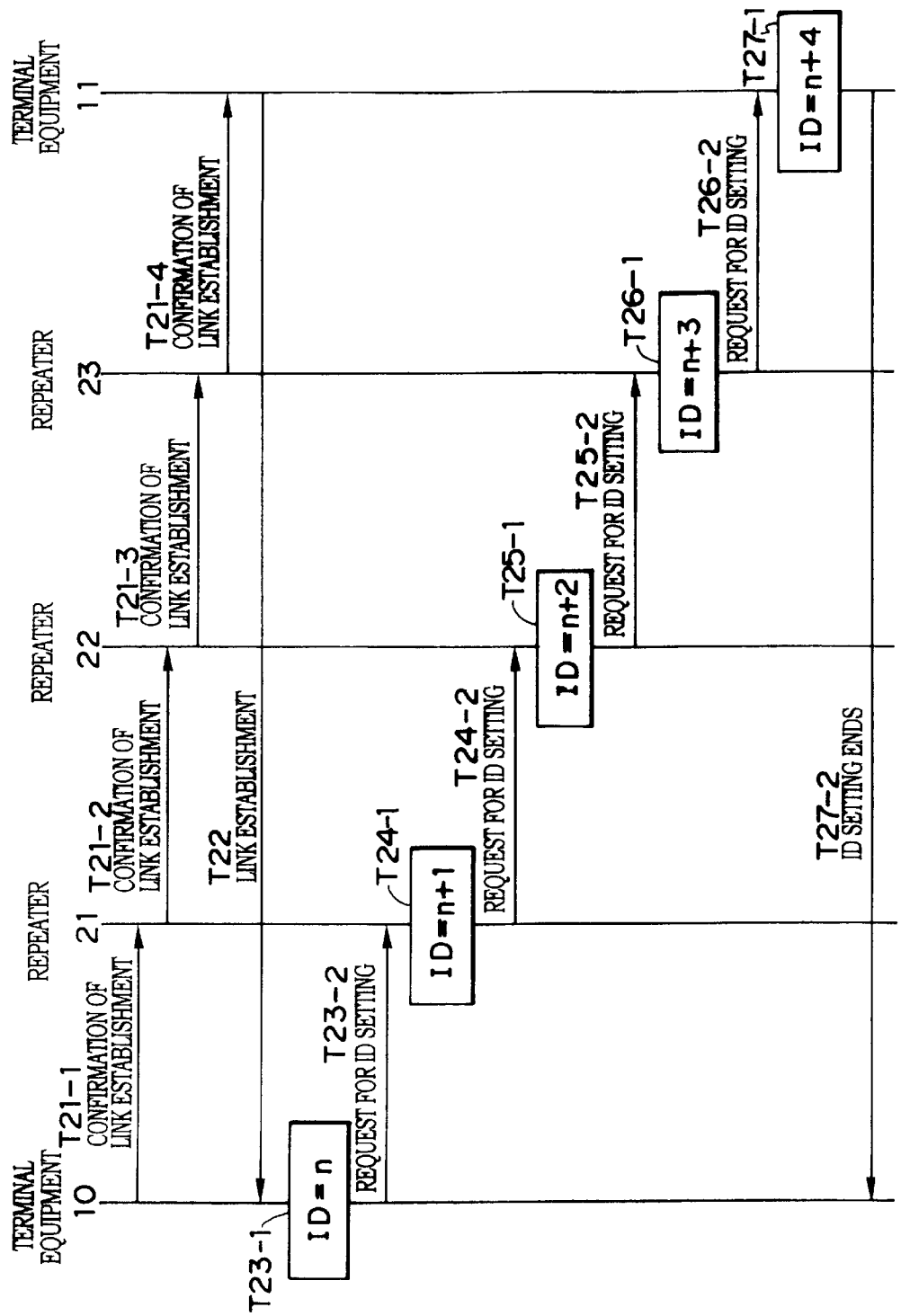
FIG. 8 is a sequence diagram which shows an identification number setting operation according to a second embodiment of the present invention.

Even when more transmission equipment is newly installed in the transmission system or some transmission equipment is removed from the transmission system, it is possible to allow reassignment and resetting of an ID for each piece of transmission equipment by executing the sequence shown in FIG. 8.

Effects of the Second Embodiment

As described above, the second embodiment is constructed in that an ID setting operation is effected in each of piece of transmission equipment in such a manner that each piece of transmission equipment sets an ID for itself and a next ID value is transmitted to an adjacent station. As a result, the following effects can be achieved:

(1) Since each piece of transmission equipment effects ID incremental processing to transmit an ID to an adjacent station, duplication of the ID can be prevented from occurring in different pieces of transmission equipment in the transmission system.

(2) Since the ID setting operation is automatically effected in such a manner that the terminal equipment and the repeaters cooperate with one another, there is no possibility that a setting error or a failure in setting can occur, and it is not necessary for the operator to execute any ID setting operation.

(3) Since the ID setting operation is effected by setting processing similar to that at the time of starting up the system even when more transmission equipment is newly installed on the transmission system or some transmission equipment is removed from the transmission system, a setting error or a failure in setting does not occur, and it is not necessary for the operator to execute any operation for alteration of ID setting. Moreover, even in this case, no duplication of the ID in the different pieces of transmission equipment occur.

OTHER EMBODIMENT

Modification of the First Embodiment

Although in the first embodiment, the "device manufacturer's name, device name, and device serial number" is shown as the device-peculiar information, other device-peculiar information may of course be used.

Further, in the first embodiment, the present invention is applied to a transmission system in which pieces of transmission equipment are continuously connected with one another along a transmission path with one piece of transmission equipment being disposed at an upstream side and/or a downstream side of each piece transmission equipment in a connected manner. However, the present invention may also be applied to a transmission system in which a certain piece of transmission equipment is connected to two or more pieces of transmission equipment disposed at an upstream side and/or a downstream side thereof.

Moreover, in the first embodiment, a description was given of a case in which the transmission system managing equipment is provided to periodically transmit the "request for adjacent-station information" or the "request for updating the adjacent-station information", but the transmission system managing system may transmit these requests when an instruction is issued from an operator. Further, in a case in which the "request for updating the adjacent-station information" is transmitted, an ending notice may be returned to the transmission system managing equipment when the transmission system managing equipment obtains the adjacent-station information from each piece of transmission equipment, and when the ending notice is transmitted from all the transmission equipment, the transmission system managing equipment may transmit the "request for adjacent-station information".

In addition, the first embodiment is constructed in that the terminal equipment and the repeaters are both provided to obtain the adjacent-station information, but only the repeaters may be provided to obtain the adjacent-station information. Even in this case, the transmission system managing equipment can hold the connected-state in the transmission system.

Meanwhile, in the first embodiment, apart from a case in which more transmission equipment is newly installed in the transmission system, when the "request for updating the adjacent-station information" is transmitted from the transmission system managing equipment to each piece of transmission equipment, each piece of transmission equipment is provided to execute an operation for obtaining the adjacent-station information. However, each piece of transmission equipment may be provided to execute the operation for obtaining the adjacent-station information periodically without the "request for updating the adjacent-station information" being transmitted from the transmission system managing equipment to each piece of transmission equipment.

Further, the first embodiment is constructed in that the transmission system managing equipment transmits determined IDs to the transmission equipment separately. However, the "ID setting request" message including all the information of each piece of transmission equipment which is formed by IDs and device peculiar information may be transmitted by broadcast communication to each piece of transmission equipment, and each piece of transmission equipment may extract an information portion relating to itself from the message to perform an internal setting operation of an ID assigned thereto.

Modification of the Second Embodiment

The second embodiment is constructed in that each piece of transmission equipment transmits an ID concerning a subsequent piece of transmission equipment to the subsequent piece of transmission equipment. However, the above-described transmission equipment may transmit an ID concerning the local device itself to the subsequent transmission equipment, and in the subsequent device the received ID is incremented to be set therein as an ID for a local device thereof.

Further, in the second embodiment, respective ID values of the adjacent pieces of transmission equipment are different from each other by only one. However, these values may be different by an arbitrary number (including a negative number).

Other Embodiment Relating to Both the First and the Second Embodiments

The supervisory control section 105 and the remote supervisory control section 208 which execute a communication procedure associated with assignment of IDs may be provided to execute the communication procedure associated with assignment of IDs by using one of hardware and software.

Selection of a command, a communication procedure and the like in accordance with an intended transmission system prevents the present invention from being limited to the transmission system formed by the terminal equipment and the repeaters. For example, the present invention may be applied to a transmission system for optical transmission, and also to a transmission system in which a monitor signal and a main signal are transmitted and received by different physical signal lines.

As described above, in accordance with the method for assigning a device identification number and apparatus for realizing the same in the first aspect of the present invention, each piece of transmission equipment obtains information of adjacent stations peculiar thereto, transmission system managing equipment collects the adjacent-station information from each piece of transmission equipment to hold a connected state of the transmission equipment, and an identification number is assigned to and set for each piece of transmission equipment. For this reason, there is no possibility that duplication of the same identification number can occur in the different pieces of transmission equipment of the transmission system. Further, a setting error of an identification or a failure in setting the identification does not occur and it is not necessary for an operator to effect any operation for setting the identification number even when more transmission equipment is newly installed in the transmission system and some transmission equipment is removed therefrom.

Moreover, the above-described effects can also be obtained by the method for assigning a device identification number and apparatus for realizing the same in the second aspect of the present invention.

What is claimed is:

1. A method of assigning a transmission-equipment identification number such that an identification number is assigned to each of a plurality of connected transmission apparatuses in a transmission system in which a transmission system managing apparatus is connected to at least one of the plurality of connected transmission apparatuses, said method comprising:

acquiring, with at least one of the plurality of transmission apparatuses, information peculiar to adjacent transmission apparatuses connected to the at least one of the plurality of transmission apparatuses, respectively;

holding the information as peripheral connected-state data of the at least one of the plurality of transmission apparatuses in the at least one of the plurality of transmission apparatuses, respectively;

collecting, with the transmission system managing apparatus, the information from the at least one of the plurality of transmission apparatuses;

determining and transmitting, with the transmission system managing apparatus, based on the information, an identification number for the at least one of the plurality of transmission apparatuses;

performing, in the at least one of the plurality of transmission apparatuses, internal setting of the identification number of the at least one of the plurality of transmission apparatuses, respectively, transmitted by the transmission system managing apparatus.

2. A method as claimed in claim 1, wherein:

said acquiring is performed with each of the plurality of transmission apparatuses, respectively, so as to acquire information peculiar to adjacent transmission apparatuses connected to each of the plurality of transmission apparatuses, respectively;

said collecting is performed such that information from each of the plurality of transmission apparatuses is collected;

said determining and transmitting is performed so as to determine and transmit an identification number for each of the plurality of transmission apparatuses; and said performing of internal setting is performed in each of the plurality of transmission apparatuses so as to internally set the identification number of each of the plurality of transmission apparatuses, respectively.

3. A method as claimed in claim 1, comprising:

acquiring, with each of the transmission apparatuses, the peripheral connected-state data of each of the plurality of transmission apparatuses, respectively, when each of the plurality of transmission apparatuses receives a request for alteration of adjacent-station information from the transmission system managing apparatus.

4. A method as claimed in claim 1, comprising:

acquiring, with a newly-installed transmission apparatus, information peculiar to adjacent transmission apparatuses connected to the newly-installed transmission apparatus; and holding the information peculiar to the adjacent transmission apparatuses connected to the newly-installed transmission apparatus as peripheral connected-state data of the newly-installed transmission apparatus in the newly-installed transmission apparatus.

5. A method as claimed in claim 1, for further use with an additional transmission system managing apparatus, said method comprising:

directly transmitting a request for setting identification numbers from the transmission system managing apparatus to the additional transmission system managing apparatus after the transmission system managing apparatus has received the identification number set in the at least one of the plurality of transmission apparatuses so as to allow a setting of identification numbers in the additional transmission system managing apparatus.

6. A transmission system comprising:

a plurality of connected transmission apparatuses; and a transmission system managing apparatus, connected to at least one of said transmission apparatuses, operable to output a request for adjacent-station information to said at least one of said transmission apparatuses and to output, to said at least one of said transmission apparatuses, a request for identification-setting including an identification number assigned to said at least one of said transmission apparatuses, respectively;

wherein each respective transmission apparatus of said plurality of transmission apparatuses includes a peripheral connected-state acquiring device operable to acquire information peculiar to adjacent transmission apparatuses connected to said respective transmission apparatus, and to hold the information as peripheral connected-state data of said respective transmission apparatus, a peripheral connected-state transmitting device operable to transmit the peripheral connected-state data to said transmission system managing apparatus in accordance with the request for adjacent-station information from said transmission system managing apparatus, and an identification number setting device operable to internally set an identification number of said respective transmission apparatus in accordance with the request for setting identification number from said transmission system managing apparatus; and wherein said transmission system managing apparatus includes an updating request device operable to transmit a request for updating adjacent-station information to said at least one of said transmission apparatuses, and an information collecting device, operable to collect the peripheral connected-state data from each of said transmission apparatuses holding peripheral connected-state data.

* * * * *